(12) United States Patent
Crouse

(10) Patent No.: US 11,166,407 B2
(45) Date of Patent: Nov. 9, 2021

(54) METHOD AND APPARATUS IN TRANSPLANTING SEEDLINGS

(71) Applicant: King City Nursery LLC, King City, CA (US)

(72) Inventor: Winston Crouse, Salinas, CA (US)

(73) Assignee: King City Nursery LLC, King City, CA (US)

( * ) Notice: Subject to any disclaimer, the term of this patent is extended or adjusted under 35 U.S.C. 154(b) by 344 days.

(21) Appl. No.: 16/424,866

(22) Filed: May 29, 2019

(65) Prior Publication Data

US 2020/0375089 A1 Dec. 3, 2020

(51) Int. Cl.
*A01C 11/02* (2006.01)

(52) U.S. Cl.
CPC .................. *A01C 11/025* (2013.01)

(58) Field of Classification Search
CPC ....... A01C 11/025; A01C 11/00; A01C 11/02; A01C 11/006
See application file for complete search history.

(56) References Cited

U.S. PATENT DOCUMENTS

| | | | |
|---|---|---|---|
| 6,591,766 B2* | 7/2003 | Williames | A01C 11/025 111/105 |
| 2010/0170426 A1* | 7/2010 | Faulring | A01C 11/025 111/105 |
| 2015/0264858 A1* | 9/2015 | Chan | A01C 11/02 700/216 |
| 2015/0342112 A1* | 12/2015 | Buell | A01C 11/02 111/105 |
| 2018/0084713 A1* | 3/2018 | Ito | A01G 9/08 |
| 2019/0045706 A1* | 2/2019 | Kafri | A01C 11/025 |
| 2020/0068792 A1* | 3/2020 | Williames | A01G 9/088 |
| 2021/0015027 A1* | 1/2021 | Moiddin | A01C 11/006 |

* cited by examiner

*Primary Examiner* — Jamie L McGowan
(74) *Attorney, Agent, or Firm* — Donald R. Boys; Central Coast Patent Agency

(57) ABSTRACT

A transplanting machine has a frame, a plowing implement, a conveyor operable to present seedlings in a tray to picking mechanisms, a plurality of mechanical gates arranged to receive the seedlings, computerized circuitry adapted to analyze portions of pixelated images of seedlings, a channel array associated with the plurality of mechanical gates, an operating mechanism in the final planting gate adapted to gate each seedling arriving at the single position into the furrow, and a closing device adapted to close the furrow. The circuitry determines a status as suitable to plant, transmits the status to a controller that activates the mechanical gates in a sequential order, except for when the seedling is not suitable, in which circumstance that mechanical gate is skipped, such that in a next cycle two seedlings will be gated to the single position together, and one will be suitable to plant.

20 Claims, 17 Drawing Sheets

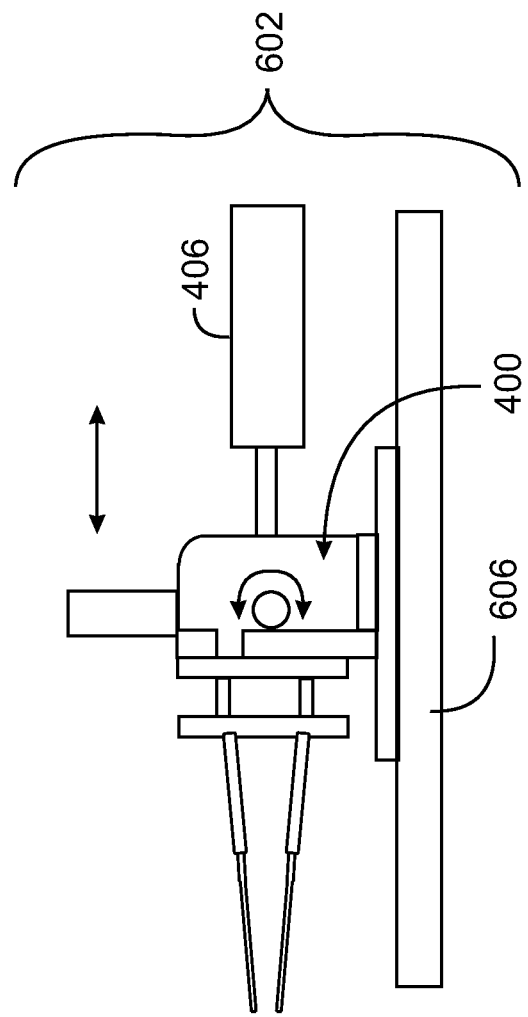
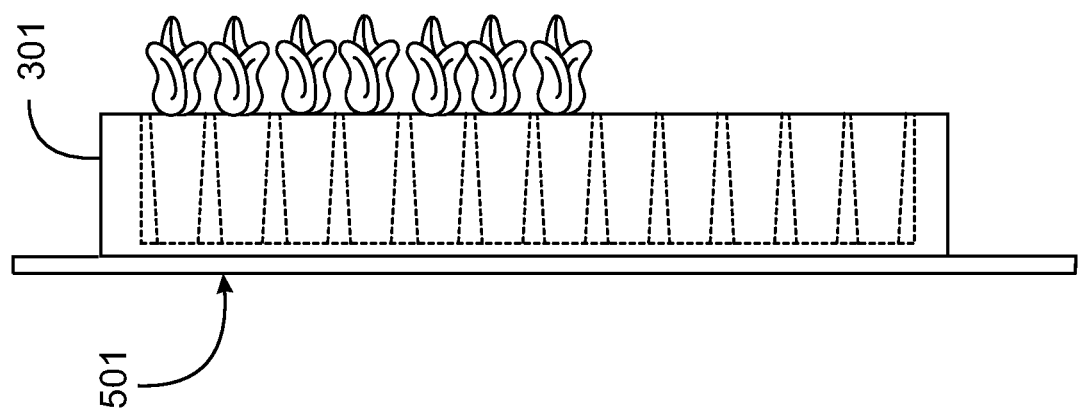
Fig. 6A

METHOD AND APPARATUS IN TRANSPLANTING SEEDLINGS

BACKGROUND OF THE INVENTION

1. Field of the Invention

The present invention is in the area of automated and semi-automated agricultural equipment and pertains more particularly to apparatus and methods for transplanting seedlings into a field.

2. Description of Related Art

Transplanting seedlings in various ways is well-known in the art. Seedlings typically are made available in a field to be transplanted in trays, usually plastic, having a matrix of rows and columns of seedlings in individual containers. The oldest method in the art is simple walking along a row to be planted, and manually removing one seedling at a time from a tray and placing it in the row, properly spaced, and continuing. Later in the art semi-automated machines that may be towed in a field, or may be self-propelled, have been developed that have mechanisms for removing individual seedlings from trays and feeding same to elements that place the seedlings with desired spacing as the machine translates along the rows, and covers at least the root ball of each seedling as it is placed.

Even though some success has been had in automating the transplanting process with transplanting machines, there are still difficult problems. A major one is that not all seedlings in a tray are developed to a point that they will provide a healthy transplanted seedling. Roughly speaking, about eighty percent of seedlings in a tray are suitable to be transplanted, and automating a process of sorting which to plant and which not to plant is a challenge, as is developing reliable mechanisms for picking the seedlings from the trays and feeding them to mechanisms that successfully perform the transplanting. In many systems in the present state of the art it is necessary to have field workers, one for each row for a machine that simultaneously plants a plurality of rows, follow along behind such a machine and inspect the seedlings that get planted, removing those they judge to be inferior for planting, and replacing each with a healthy seedling. This is quite labor intensive, and judgement may be questioned as well.

What is clearly needed is a transplanting machine that works with standard seedling trays, that may have a significant percentage of reject seedlings, and ensures, automatically, without added labor, that every position in every row receives a healthy and viable seedling, so no following labor is needed. The present invention deals with this problem.

BRIEF SUMMARY OF THE INVENTION

In an embodiment of the invention a transplanting machine is provided, comprising a frame capable of being translated through a field, at least one plowing implement mounted on the frame, plowing at least one furrow in the field in the direction that the frame is translated, for each plowing implement mounted on the frame, a conveyor operable to present seedlings in a tray to picking mechanisms adapted to pick a plurality of seedling simultaneously, and to present the seedlings picked to an imaging device to capture and record a pixelated image of each seedling picked and presented, a plurality of mechanical gates arranged to receive the seedlings from the picking mechanisms, each seedling placed into an individual mechanical gate, computerized circuitry adapted to analyze portions of the pixelated images of the seedlings, determining suitability of the seedlings to be planted, a channel array associated with the plurality of mechanical gates, the channel array having a channel for each mechanical gate, wherein each channel in the channel array leads to a single position at a final planting gate, an operating mechanism in the final planting gate adapted to gate each seedling arriving at the single position into the furrow, and a closing device adapted to close the furrow as each seedling is placed in the furrow. The computerized circuitry determines a Yes/No status for each seedling imaged as suitable to plant; and transmits the status to a controller managing the plurality of mechanical gates, and the controller activates the mechanical gates in a sequential order, feeding a seedling to the single position with each activation, except for a circumstance in which the seedling in the mechanical gate to be activated has been determined to be unsuitable to plant, in which circumstance that mechanical gate is not activated in the sequential order. In this circumstance, in a subsequent cycle a seedling determined to be suitable to plant will be placed in the mechanical gate along with the seedling determined to be unsuitable to plant, and the two seedlings will be gated to the single position together, and will be planted in the furrow together, ensuring that every potential position for a seedling in the furrow will be planted with a seedling that is determined to be suitable to plant.

In one embodiment the transplanting machine comprises two or more plowing implements mounted on the frame providing two or more furrows to be planted with seedlings, wherein the associated elements for each furrow plant a seedling suitable to be planted in each potential position for a seedling in each furrow. Also, in one embodiment the conveyor for each furrow is an elevator presenting trays of seedlings in individual rows of cavities to a set of two or more side-by-side picking mechanisms. In one embodiment the picking mechanisms are pneumatically operated with fingers adapted to operate horizontally to pick seedlings from the tray, and wherein the picking mechanisms, retracting from the tray, rotate to present the seedlings in a vertical aspect to the imaging device. And in one embodiment the imaging device is an optical device capturing grayscale images, wherein each pixel has one pixel value representing brightness.

In one embodiment the computerized circuitry divides the pixelated image into a plurality of individual pixel regions for each seedling image, the pixel regions associated with different portions of the seedling, and wherein the individual regions are separately analyzed, assigning a numerical value for each, and the values for the individual regions are used in determining suitability of the seedling to plant. Also, in one embodiment the imaging device is an optical device capturing color images, wherein each pixel has a plurality of pixel values representing color values, and wherein different colors are preferentially evaluated by the computerized circuitry in determining suitability of seedlings to plant. In one embodiment the imaging device is an infra-red camera, and images are analyzed for temperature of different regions, and compared to expected temperature values in determining suitability of seedlings to plant. In one embodiment the machine comprises two plowing implements plowing two furrows, three picking mechanisms operating side-by-side, picking three seedlings at a time from the tray, and six mechanical gates accepting individual seedlings for providing to the single position at the final planting gate. And in one embodiment the machine comprises four plowing implements plowing two furrows, three picking mechanisms operating side-by-side, picking three seedlings at a time from the tray, and six mechanical gates accepting individual seedlings for providing to the single position at the final planting gate.

In another aspect of the invention a transplanting method is provided, comprising translating a frame through a field, plowing at least one furrow in the field in the direction that the frame is translated by at least one plowing implement mounted on the frame, presenting seedlings in a tray on a conveyor to picking mechanisms adapted to pick a plurality of seedling simultaneously from the tray, and presenting the seedlings picked to an imaging device capturing and recording a pixelated image of each seedling picked and presented, placing each seedling in a mechanical gate of a plurality of mechanical gates arranged to receive the seedlings from the picking mechanisms, analyzing portions of the pixelated images of the seedlings by computerized circuitry, determining suitability of the seedlings to be planted, placing the seedlings in individual channels of a channel array from the mechanical gates, guiding each seedling to the final planting gate adapted to gate each seedling arriving at the single position into the furrow, closing the furrow for each seedlings placed in the furrow by closing device, determining a Yes/No status for each seedling imaged as suitable to plant, transmitting the status as suitable to plant for each seedling to a controller managing the mechanical gates, and activating the mechanical gates in a sequential order, feeding a seedling to the single position with each activation, except for a circumstance in which the seedling in the mechanical gate to be activated has been determined to be unsuitable to plant, in which circumstance that mechanical gate is not activated in the sequential order, such that in a subsequent cycle a seedling determined to be suitable to plant is placed in the mechanical gate along with the seedling determined to be unsuitable to plant, and the two seedlings are gated to the single position together, and planted in the furrow together, ensuring that every potential position for a seedling in the furrow is be planted with a seedling that is determined to be suitable to plant.

In one embodiment the method comprises plowing two or more furrows by two or more plowing implements mounted on the frame. Also, in one embodiment the method comprises presenting trays of seedlings by an elevator in individual rows of cavities to a set of two or more side-by-side picking mechanisms. In one embodiment the method comprises operating the picking mechanisms horizontally with mechanical fingers of the picking mechanisms pneumatically activated to pick seedlings from the tray, and retracting seedlings from the try and rotating to vertical aspect to present the seedlings to the imaging device. And in one embodiment the method involves capturing grayscale images with an optical device, wherein each pixel has one pixel value representing brightness.

In one embodiment the method comprises dividing the pixelated images by the computerized circuitry into a plurality of individual pixel regions for each seedling image, the pixel regions associated with different portions of the seedling, and separately analyzing the individual regions, assigning a numerical value for each, and using the values for the individual regions in determining suitability of the seedling to plant. IN one embodiment the method involves capturing color images, wherein each pixel has a plurality of pixel values representing color values, and wherein different colors are preferentially evaluated by the computerized circuitry in determining suitability of seedlings to plant. In one embodiment the method comprises capturing images with an infra-red camera, analyzing the images for temperature of different regions, and comparing to expected temperature values in determining suitability of seedlings to plant.

In one embodiment the method comprises plowing two furrows, using three picking mechanisms operating side-by-side for each furrow, picking three seedlings at a time from the trays, and operating six mechanical gates accepting individual seedlings for providing to the single position at the final planting gate. And in one embodiment the method comprises plowing four furrows, using three picking mechanisms operating side-by-side for each furrow, picking three seedlings at a time from the trays, and operating six mechanical gates for each furrow accepting individual seedlings for providing to the single position at the final planting gate.

BRIEF DESCRIPTION OF THE SEVERAL VIEWS OF THE DRAWINGS

FIG. 6A is an elevation view of the tray of FIG. 5, from a viewpoint to the side, illustrating picking mechanisms in a horizontal aspect.

DETAILED DESCRIPTION OF THE INVENTION

Figure 1:
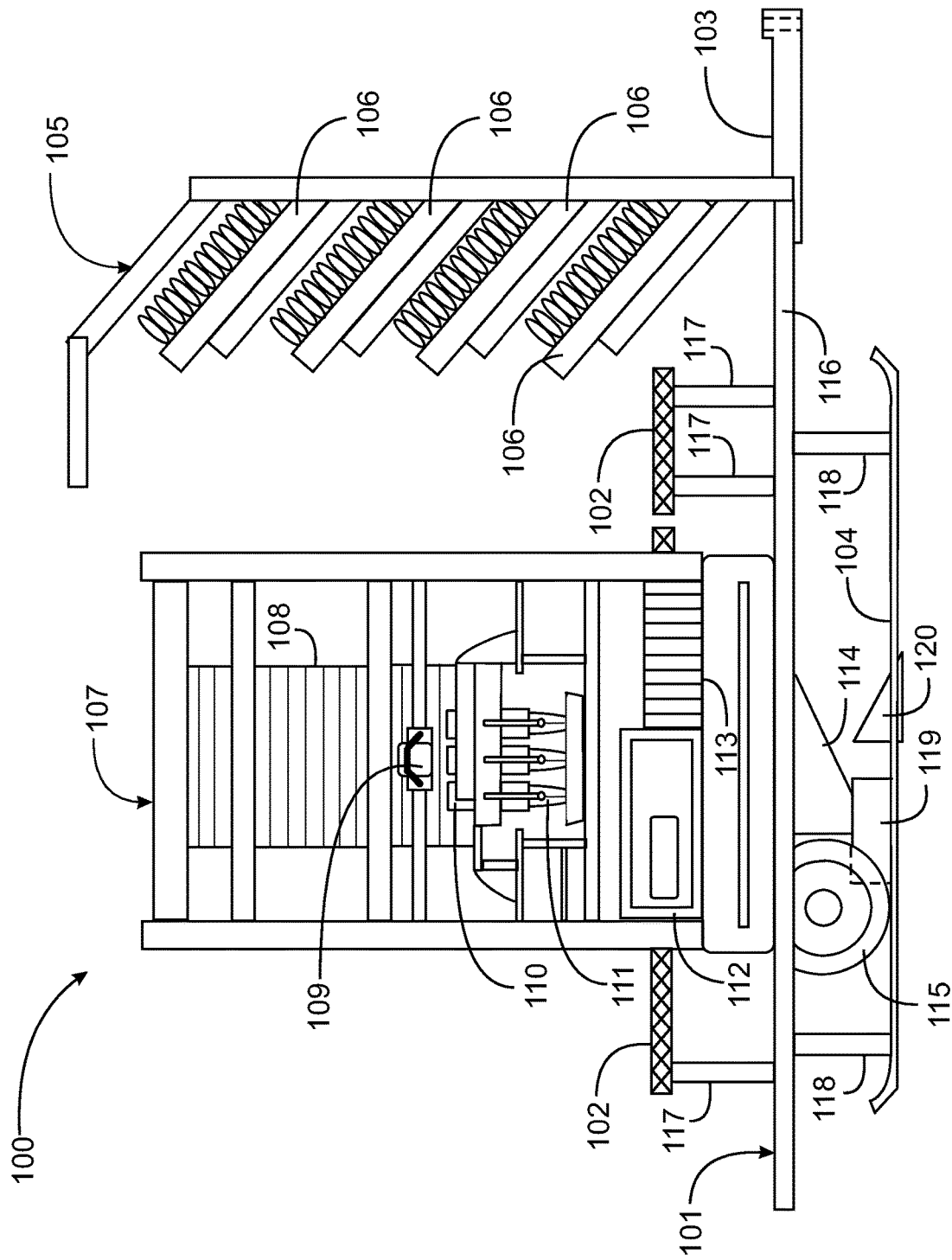
FIG. 1 is a side elevation view of a transplanting machine in an embodiment of the present invention.
Figure 2:
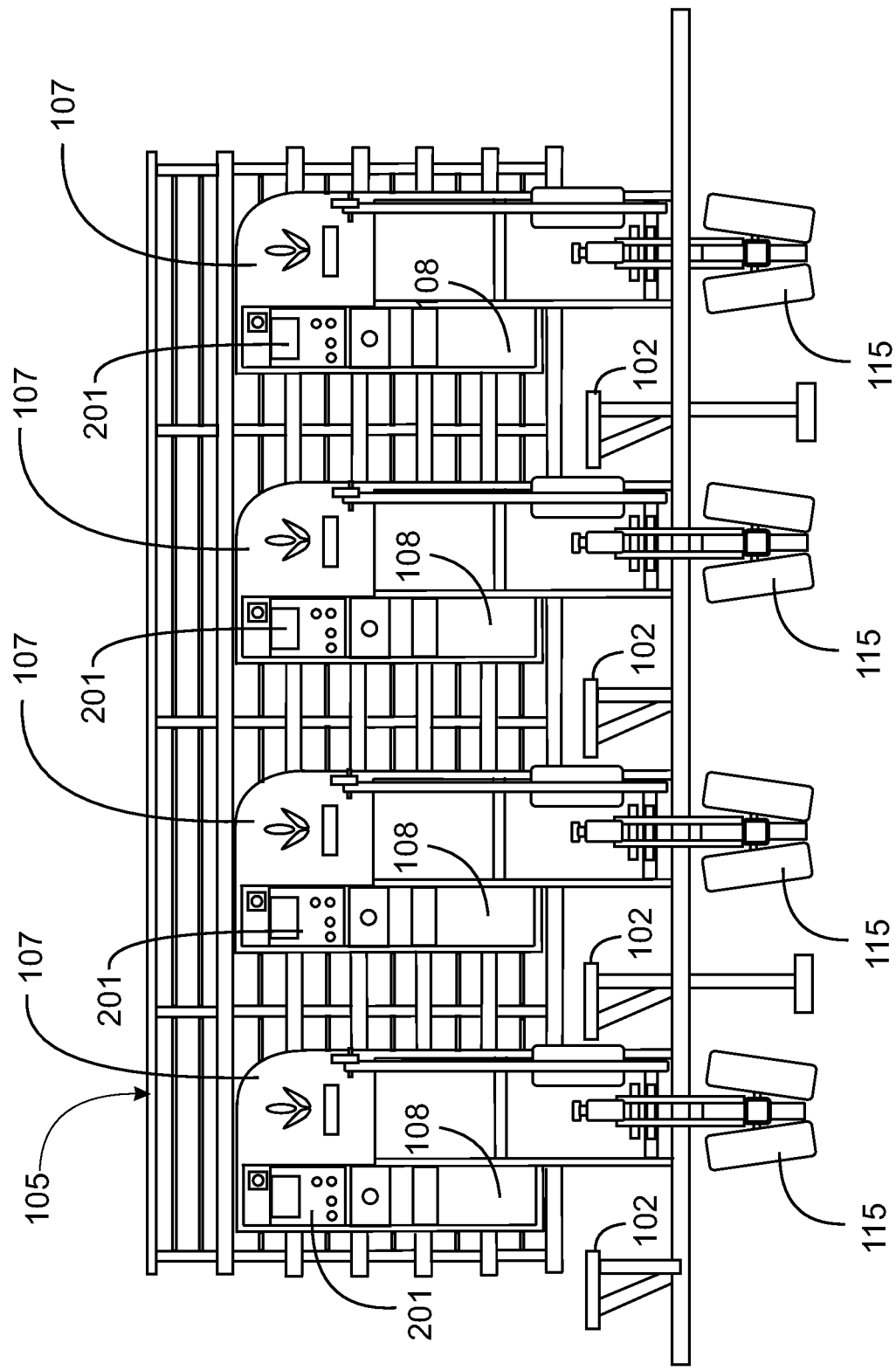
FIG. 2 is a rear elevation view of the transplanting machine of FIG. 1 in an embodiment of the invention.

FIG. 1 is a side elevation view of a transplanting machine 100 in an embodiment of the present invention. FIG. 2 is a rear elevation view of the transplanting machine of FIG. 1 in an embodiment of the invention. The machine in this example is based on a welded framework 101 at least partly comprising standard square tubing, welded and painted. There is a substantially horizontal deck 116 that forms a base for the rest of the frame, which comprises walkways 102 on supports 117, and a shelving arrangement 105 for supporting trays 106 of seedlings to be planted. The frame, and thus the entire machine, is translated in a field to be planted on skid rails 104 which support the frame on supports 118. The machine is coupled in this example to a tractor by hitch elements 103. In some other embodiments the machine may be self-propelled.

In this example there are four modular automatic feeding systems 107 carried on frame 101, which may be seen in FIG. 2 as being spaced side-by-side across a width of the machine. In alternative embodiments there may be just one, or two, or three systems 107 instead of the four shown. Each unit is dedicated to planting seedlings in a single row in a field. The spacing is such that each automatic feeding system 107 is positioned to serve one row, and in this example four rows are transplanted simultaneously. The view of FIG. 2 is from behind the machine, which is towed in a direction away from the view of FIG. 2.

Referring back to FIG. 1, showing a side view of one of the four automatic feeding systems 107, there is in this example a vertically moving elevator 108 which is adapted to accept and translate trays 106, with the plane of the tray vertical, presenting seedlings in the tray horizontally to picking mechanisms not shown in FIG. 1, that are described in enabling detail below. The picking mechanisms are adapted to pick three seedlings simultaneously from a tray presented in a vertical aspect, then to rotate by ninety degrees to present the picked seedlings vertically in front of a commercial high-resolution imaging device 109. Imaging device 109 has a critical function in determining which seedlings are fit to plant, and which are not. The process by which this determination is made is described in enabling detail below.

Once seedlings are picked from a tray and presented to the imaging device, an imaging filter software determines for each seedling whether that seedling is viable to be planted alone in the field. Then the seedlings are dropped into vertically oriented guide tubes 110 which lead to clamshell dispensers. The clamshell dispensers are individually controlled to feed one seedling at a time to a feed path 114, delivering each seeding to a planting device 119 that triggers to place each individual seedling, immediately after it arrives, in a furrow (not seen) that is formed by a plow implement 120. A pair of inwardly tilted wheels 115 push soil back into and over the furrow, to cover the root ball of each seeding placed in the furrow. These operations are performed by each automatic feeding system 107 simultaneously, serving four rows in a field being planted.

Each separate automatic feeding system 107 is controlled by a programmable logic controller (PLC) 112, which triggers solenoids 113 that operate pneumatic valves to perform all mechanical operations through pneumatic cylinders and other pneumatic operators. An air pressure system (not shown) provides high-pressure air for operation of the various devices on the machine.

Referring again to FIG. 2, a control panel 201 comprising manual controls and a display is provided. It is through this panel that each automatic feeding system 107 is tested and turned on and off as needed. Elevated walkways 102 are provided between each machine as shown in FIG. 2, which enables workers to load seedling trays into elevators 108 and to remove same when empty.

Figure 3A:
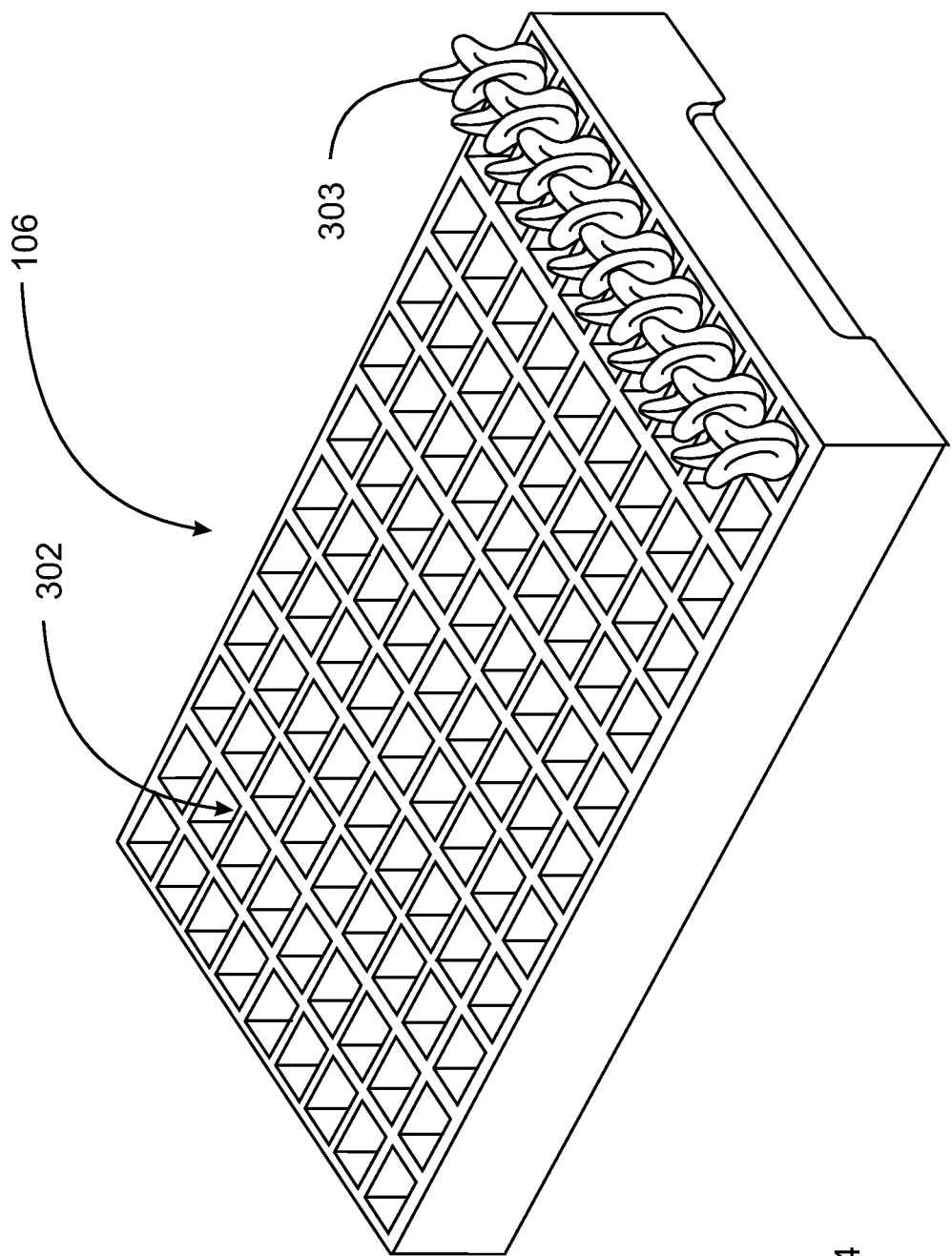
FIG. 3A is a perspective view of a seedling tray in an embodiment of the invention.

FIG. 3A is a perspective view of seedling tray 106 as may be used in one embodiment of the invention. Tray 106 comprises in this example individual cavities 302 wherein seedlings 303 may be started from seeds, typically in a nursery environment providing water and fertilizer to start the seedlings. One row of nine cavities is shown with seedlings established and the rest of the rows are shown empty. In use in the transplanting machine, typically all compartments would have seedlings.

Figure 3B:
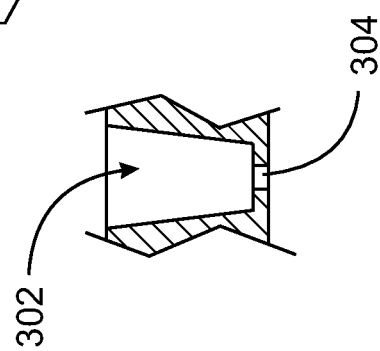
FIG. 3B is a partial section through one cavity in the seedling tray of FIG. 3A.

Although it is not readily apparent in FIG. 3A, individual cavities 302 in the tray in one embodiment have sidewalls that are angled inward from the top. This is shown in FIG. 3B, which is a partial section view of one tray 302. Individual cavities in one embodiment also have a pass-through hole 304 in the bottom of the cavity. The purpose of the pass-through hole is clearance for a punch that is used in extracting seedlings from cavities, as is described further below. The angled sidewalls and the ability to also push seedlings from the bottom greatly facilitate the extraction of seedlings from the trays.

Trays 106 may be provided in different configurations. The cavities may be implemented in a single tray unit as shown, which is preferable for use in the machine in embodiments of the invention. In some circumstances the cavities may be in individually removable units, such as plastic containers. It is also noted that the characteristics of tray 301 in this embodiment is exemplary only, and trays of many different configurations may be used.

Figure 4A:
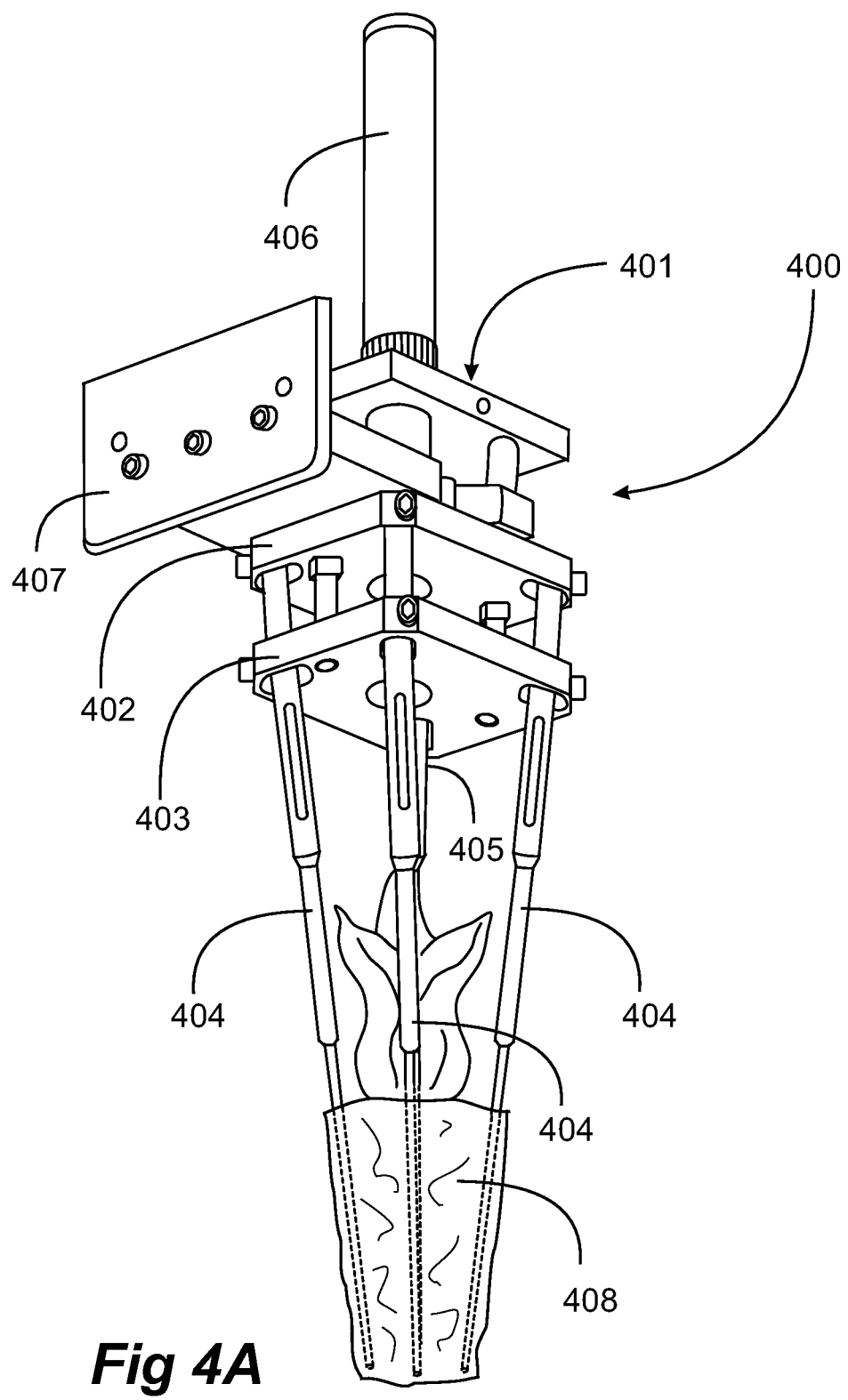
FIG. 4A is an elevation perspective view of a picking mechanism in closed position in one embodiment of the invention.
Figure 4B:
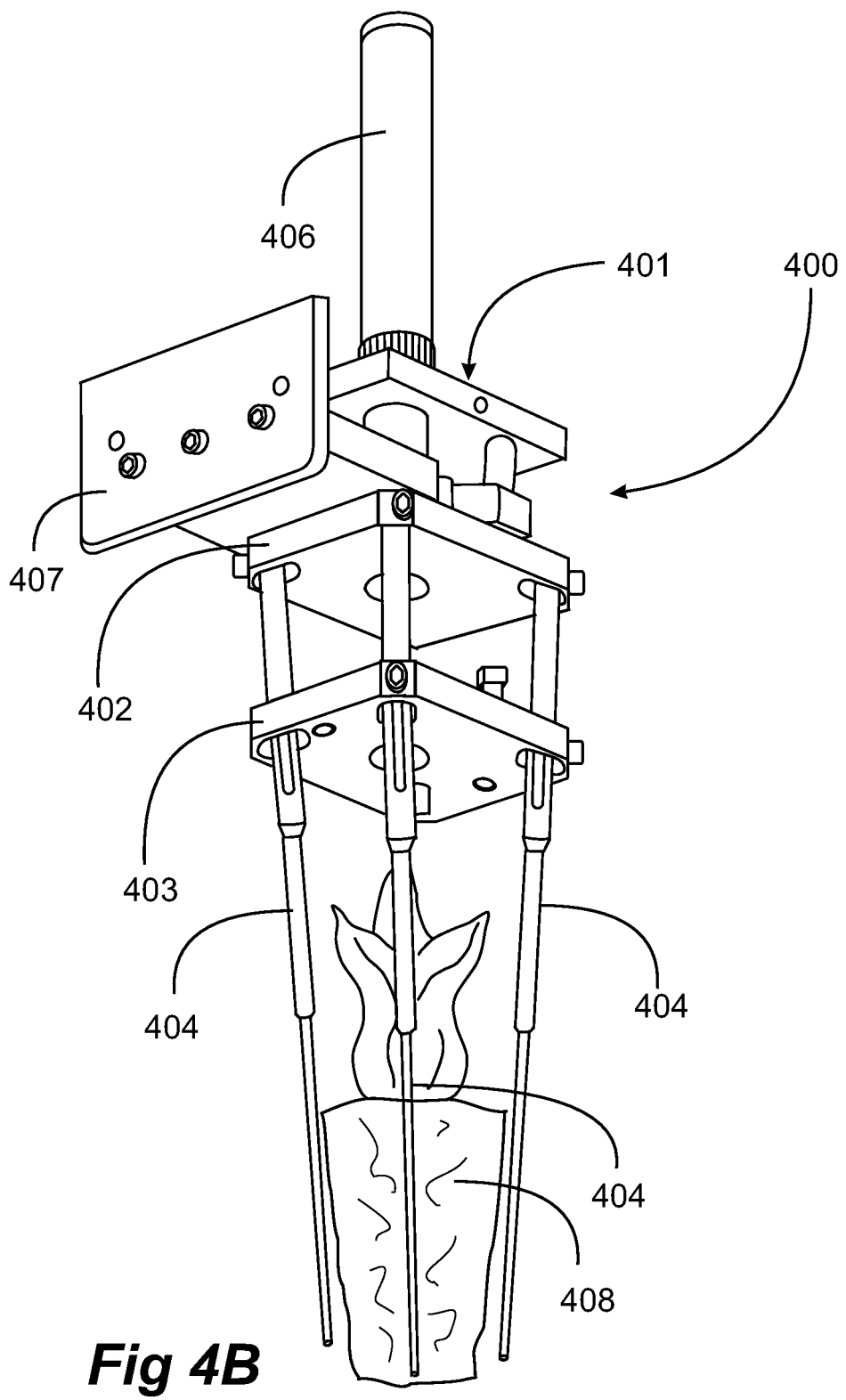
FIG. 4B is an elevation view of the picking mechanism of FIG. 4A in open position.

FIG. 4A is an elevation perspective view of a picking mechanism 400 in one embodiment of the invention, usable to pick a seedling by the root-ball from an individual cavity in a tray. In this device there are four fingers 404 projecting downward from a frame assembly 401. Fingers 404 are shown grasping a seedling by the root ball 408 on four sides, as shown. The fingers may be opened and closed toward and away from one another to a limited degree by action of a pneumatic cylinder 406 operating in concert through plate 402, the shaft of the cylinder connected to guide plate 403. Mechanism 400 may be mounted, for example by plate 407, to linkage and translation mechanisms through which the picker mechanism may be rotated to a horizontal aspect, and may be translated by mechanics not shown in this view to a seed tray, where a seedling may be picked from a cavity in the tray, after which the mechanism may be translated away from the tray, withdrawing the seedling by the root ball, and then the mechanism is rotated back to a vertical aspect, where seedlings may be imaged to be evaluated, and then dropped into a chute to a feeding mechanism in the transplanting operation. FIG. 4B illustrates picking mechanism 400 of FIG. 4A with cylinder 406 extended, translating plate 403 downward to move fingers 404 apart, as shown, releasing seedling 408.

Figure 5:
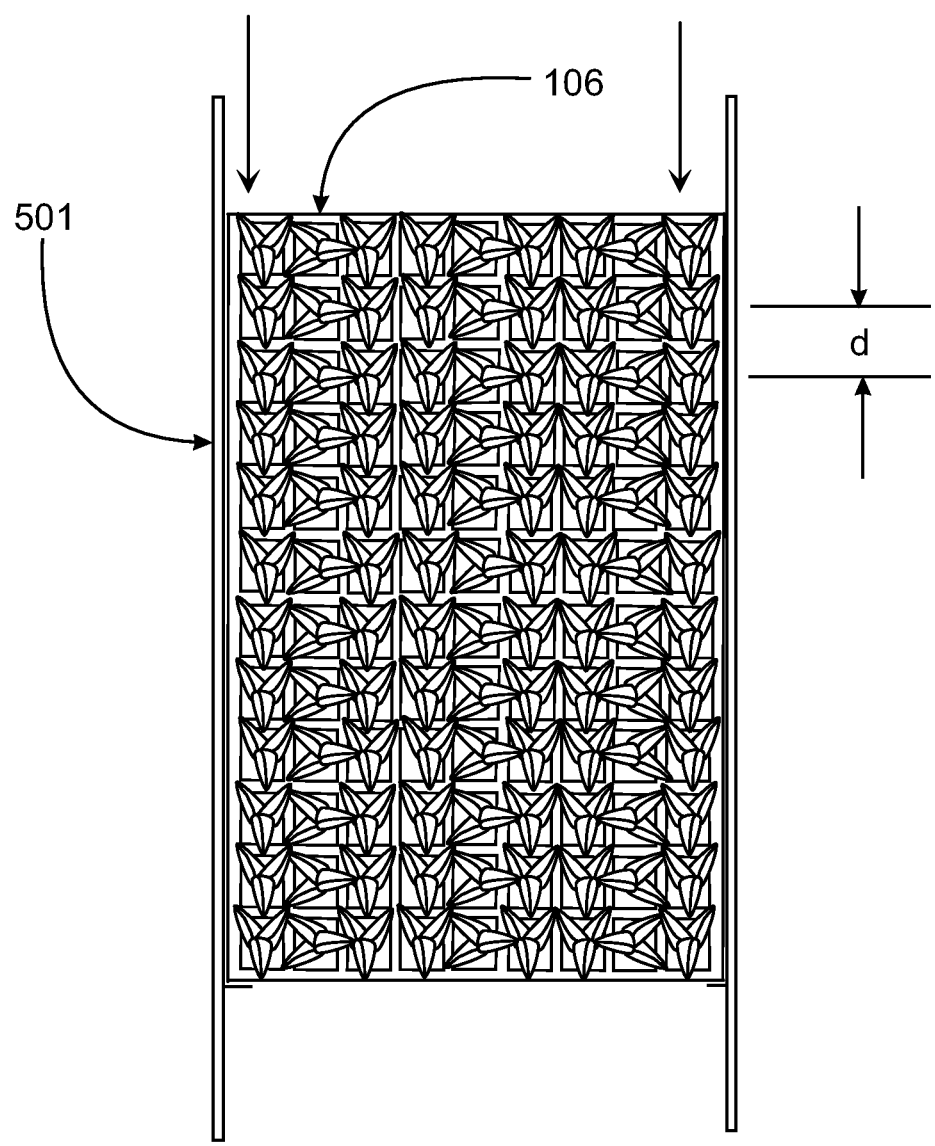
FIG. 5 is an elevation view of a tray from the front in an embodiment of the invention.

FIG. 5 is an elevation view of one seedling tray 106 captured in a vertically-indexing elevator 501, capable of indexing the tray typically in a downward direction, one cavity row (dimension d) at a time. Elevator 501 is operated, partly by a chain and sprocket mechanism driven by an electric stepping motor, controllable for precise positioning, and precise indexing as well. In one embodiment elevator

501 is adapted for specific lateral movement to facilitate positioning cavities in tray 106 for extraction by mechanisms 400.

FIG. 6A is an elevation view of tray 106 of FIG. 5, from a viewpoint to the side, carried by elevator 501, illustrating picking mechanisms 400 on a rotating and translating mechanism 606. Mechanism 606 is adapted to carry, in this implementation, three picking mechanisms 400, side-by-side, horizontally back-and forth to insert pins 404 into and out of individual cavities in tray 106. The picking mechanisms are also rotatable to a vertical aspect from the horizontal aspect shown in FIG. 6A. One picking mechanism is apparent in this view, but in one embodiment of the invention there are three of the mechanisms side by side, all integrated with the same rotating and translation mechanism 601. The side-by-side arrangement hides the remaining two mechanisms in FIG. 6A. The rotating and translation apparatus, together with the picking mechanism 400, with cylinder 406, constitutes apparatus 602.

Figure 6B:
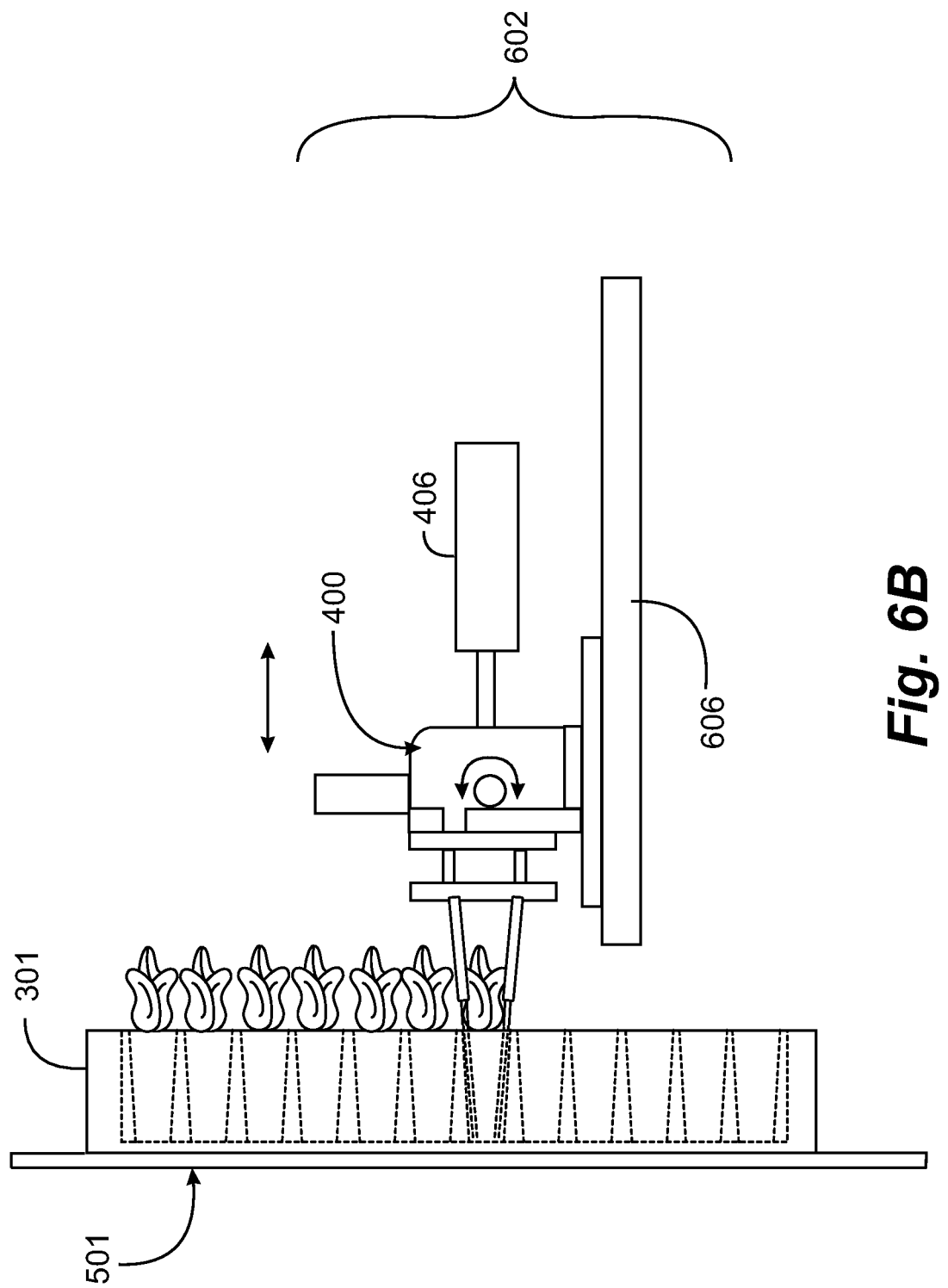
FIG. 6B is an elevation view of the picking mechanisms of FIG. 6A advanced into the tray in an embodiment of the invention.

FIG. 6B illustrates the picking apparatus 602 having been translated horizontally to the left, placing the fingers 404, which may first be separated by extension of cylinder 406, into an individual cavity of tray 301, where cylinder 406 may be retracted again to move fingers 404 together enough to grasp the root ball of a seedling in the cavity in the tray that is entered. There are two other mechanisms being positioned at the same time, so three seedlings are grasped in concert.

Figure 6C:
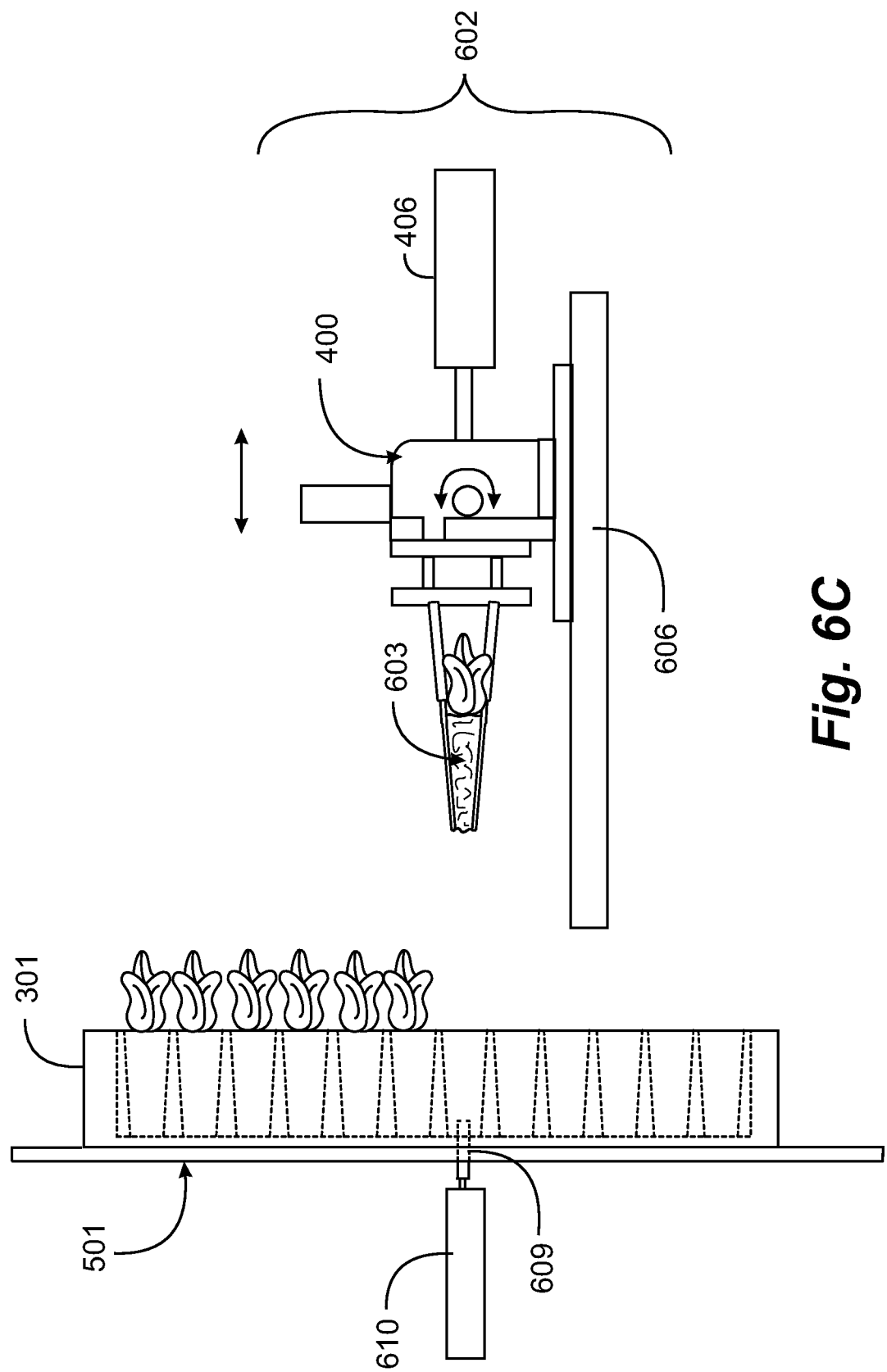
FIG. 6C is an elevation view of the picking mechanisms of FIG. 6B withdrawn for the tray, holding seedlings, in an embodiment of the invention

FIG. 6C illustrates the picking apparatus withdrawn to the original position in front of tray 301, showing a seedling 603 held by the root ball by the fingers of mechanism 400. It is again noted that in this example there are three picking mechanisms 400 side-by-side in a line parallel with the front of tray 301, and the three picking mechanisms act in concert, so three seedlings are picked from tray 301 simultaneously. Referring back to FIG. 3B, noting through-hole 304, which is implemented in the bottom of each cavity 302, in FIG. 6C punches 609 are shown, driven by pneumatic cylinders 610, timed to push the root ball from the cavity in concert with the fingers of the picking mechanism extracting the root ball.

Figure 6D:
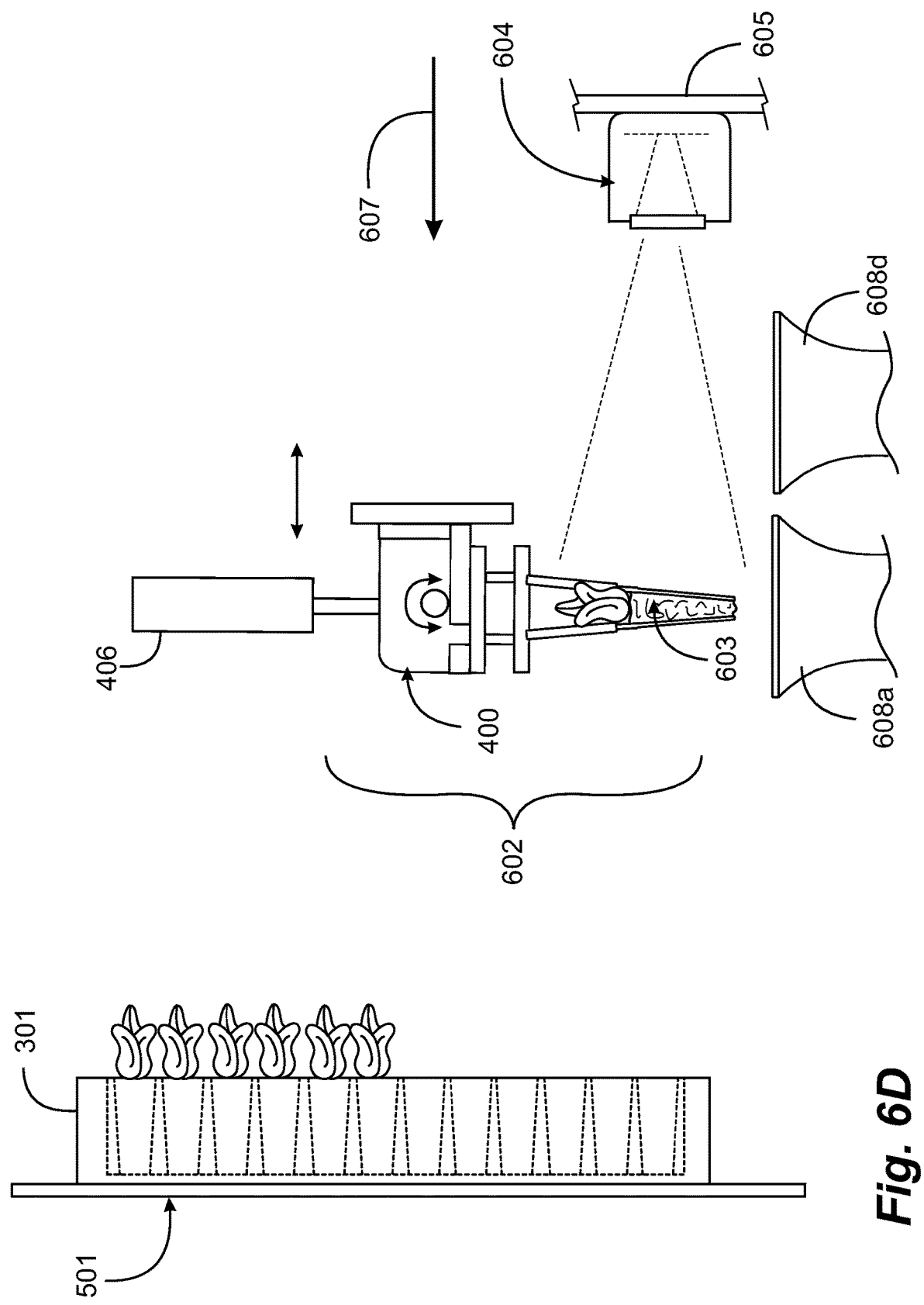
FIG. 6D is an elevation view of the picking mechanisms of FIG. 6C rotated to a vertical aspect in an embodiment of the invention.

FIG. 6D illustrates apparatus 602 rotated by ninety degrees to a vertical aspect such that seedlings 603 are held vertically in front of a commercial imaging device 604 mounted on a portion 605 of the frame of the machine. Apparatus 606 is not shown in this view to avoid confusion. An important purpose of imaging device 604 is to image the three seedlings, and in particular the root balls of the seedlings, and image filters are utilized to assess the suitability of each seedling to be transplanted. This is necessary because not all seedlings in a tray such as tray 301 may be healthy and developed to a point to be suitable to transplant. IN some experience it is known that up to thirty to forty percent of seedling in a tray 106 may not be suitable to plant.

Once an image is registered, and analyzed, a code is associated with each seedling as to suitability to plant. The code indicates simply Yes or No. Whether or not the seedling in each picking mechanism is deemed suitable to plant, all three seedlings are dropped into funnels, here labeled 608a and 608d, that direct the seedling into clamshell gates at a lower level, where seedlings may be released by opening gates one at a time in a calculated order, depending in part on the deemed suitability to plant of each seedling.

It is noted that there are two rows of three funnels 608x. These are aligned side-by side in a direction parallel with the front of tray 301, as are the picking mechanisms, so in the position shown in FIG. 6D the three seedlings held in the picking mechanisms are viewable by imaging device 604, and are held directly over three funnels 608a, 608b and 608c. In another cycle apparatus 602 is withdrawn to a further position to have the three seedlings held directly over another row of three funnels 608d, 608e and 608f, which will be apparent with reference below to FIG. 7.

Figure 7:
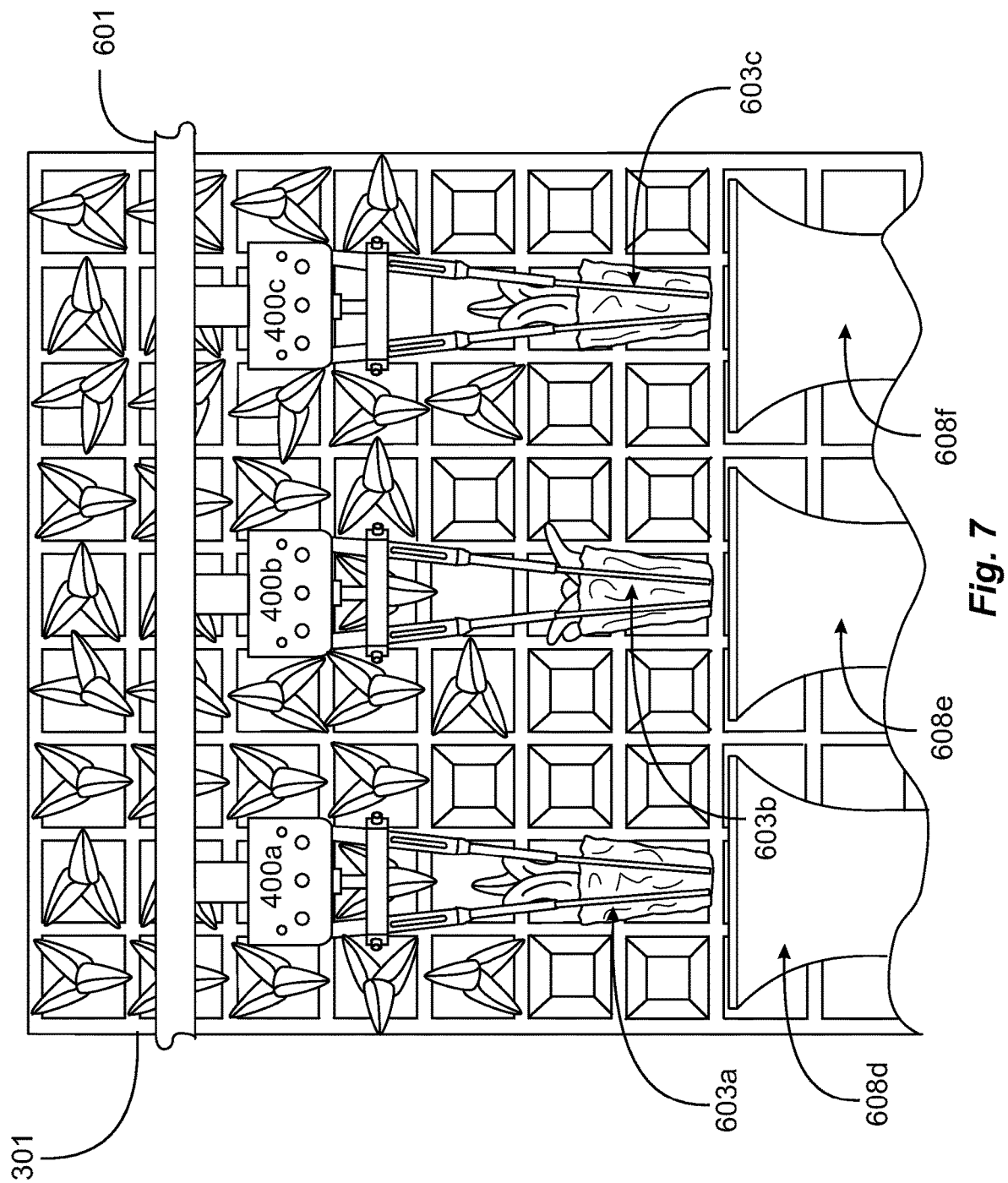
FIG. 7 is an elevation view of the picking mechanisms of FIG. 6C, seen in a direction toward the front of the tray in an embodiment of the invention.

FIG. 7 is an elevation view of the three side-by-side picking mechanisms 400 from a viewpoint rotated 90 degrees from that of FIGS. 6A through 6D, in the direction of arrow 607 in FIG. 6D. The picking mechanism are labeled in this view 400a, 400b and 400c. Many cavities of tray 301 are shown with seedlings in place, and many are shown empty. It may be assumed that some cavities are empty because the seedlings in these cavities have been picked by the picking mechanisms. Picking mechanisms 400a, 400b and 400c are shown in the vertical aspect over three funnels 608d, 608e and 608f, and holding seedlings 603a, 603b and 603c. The imaging device is not shown in FIG. 7, but it may be noted that the viewpoint of FIG. 7 is substantially the viewpoint of the imaging device.

It may be seen that there are nine cavities across in tray 301 in this example, and it apparent that the three picking mechanisms may pick three seedlings at a time from three cavities in a row of nine cavities. It is apparent that after picking three seedlings from a row of cavities that either the picking mechanisms have to translate laterally to a new position where they may access three more seedlings in the same row, or the elevator that holds the tray has to translate laterally.

In one embodiment the spacing of the picking mechanisms may change, with the center mechanism of the three not moving, but the outside two may translate laterally by one cavity spacing. The elevator may translate laterally as well such that all nine cavities in a row in a tray may be accessed by the three mechanisms in three cycles. In a first cycle with the picking mechanisms going forward, as in FIG. 6B, picking three seedlings, then retracting as in FIG. 6C, three seedlings are extracted. In a next cycle the elevator may reposition or the spacing of the picking mechanisms may be adjusted, and three more seedlings are extracted from the same row. Then in a third cycle, with repositioning of the picking mechanisms or the elevator, or both, the last three of nine seedlings in a row are extracted. After all nine seedlings are extracted, the elevator indexes down one cavity spacing to present another row of nine seedlings to the picking mechanisms.

At a predetermined point in the operation of the elevator, an attendant takes another tray from shelving arrangement 105 (see FIG. 1), and places same in the elevator. The same attendant may access empty trays from the elevator and place the empties for pick up and replacement with full trays.

Figure 8:
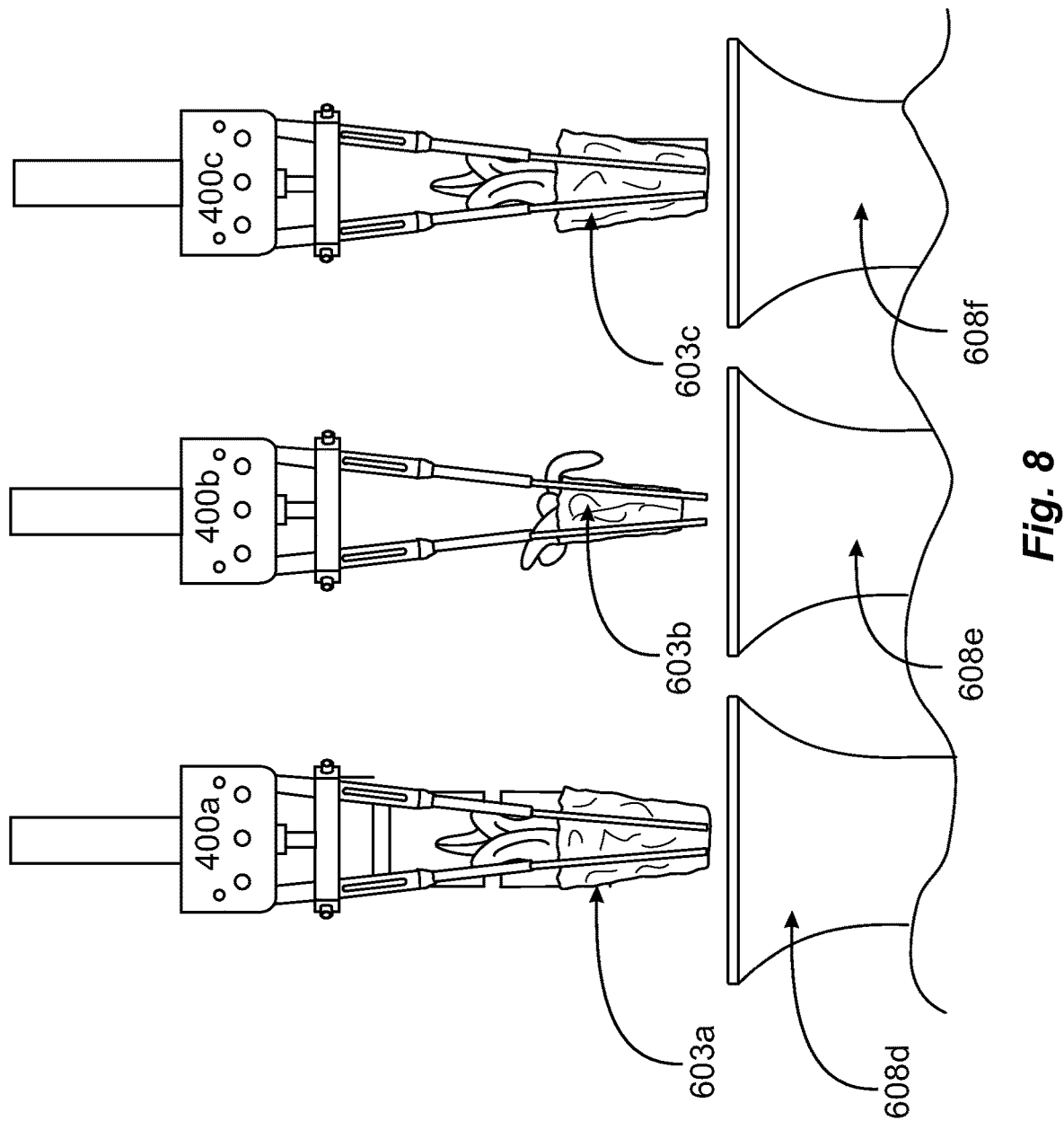
FIG. 8 is an elevation view as in FIG. 7 showing three picking mechanisms holding seedlings in an embodiment of the invention.

FIG. 8 is an elevation view as in FIG. 7, showing the three picking mechanisms 400a, 400b and 400c holding seedlings in an embodiment of the invention, but with the elevator and trays not shown to avoid confusion in the picture. Funnels 608d, 608e and 608f are shown in FIG. 8. It is important to note in FIG. 8 that seedlings 603a and 603c, held respectively by picking mechanisms 400a and 400c, are healthy seedlings, each with a healthy root ball, but seedling 603b, held by mechanism 400B, seems to have a smaller root ball, and the foliage is drooped and less developed than the healthy seedlings.

It was described briefly above that an important purpose of the transplanting machine in embodiments of the invention is to ensure as much as possible that every potential position for a seedling in each row being simultaneously served receives a healthy seedling. This is not automatic under the circumstance that a tray of seedlings may well have several seedlings in random positions in the tray, that are not really suitable to be planted. Seedling 603*b* in FIG. 8 represent one such seedling unsuitable to be planted. In this case seedling 603*b* is seen to have a root ball that is smaller in girth, and also height than the healthier seedlings, and the foliage of seedling 603*b* is drooping and underdeveloped. There may be other indications of seedlings not suitable to be planted in other circumstances.

Figure 9:
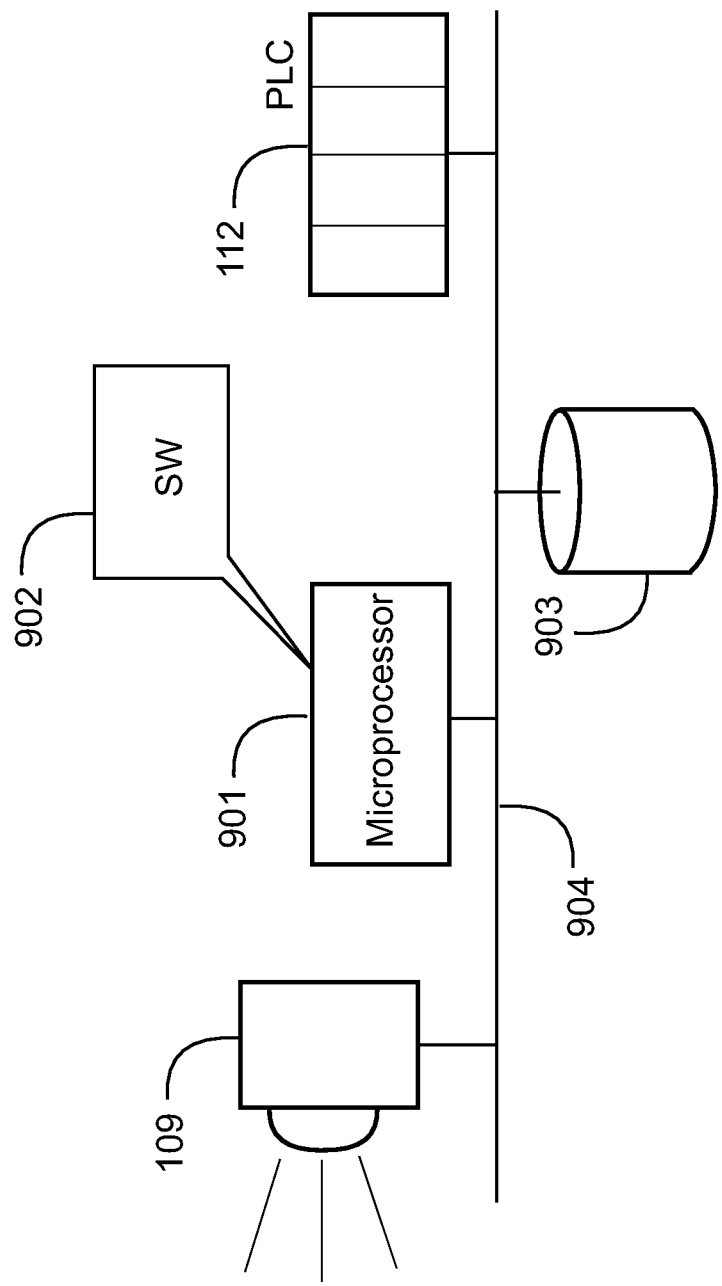
FIG. 9 is a diagram of a digital processing elements in an embodiment of the invention.

FIG. 9 is a diagram showing imaging device 109 and interconnection to a microprocessor 901 executing software (SW) 902, a data repository 903, and to PLC 112, by a bus system 904. In an embodiment of the invention the imaging device images seedlings as they are presented to the imaging device by the picking mechanisms, with the images stored in data repository 903. SW 902 analyzes the images, determining suitability of seedlings to be planted, and communicates decisions to PLC 112 to be used in a process of feeding the seedlings from the picking mechanisms to gating devices that operate in sequence to feed seedlings to mechanisms that place the seedlings in the furrow that is formed by plow implement 120. The image and analysis are done in a very short time, as the picking mechanisms do not stay in front of the imaging device for long and continue to cycle to pick a next set of seedlings from the tray.

Figure 10:
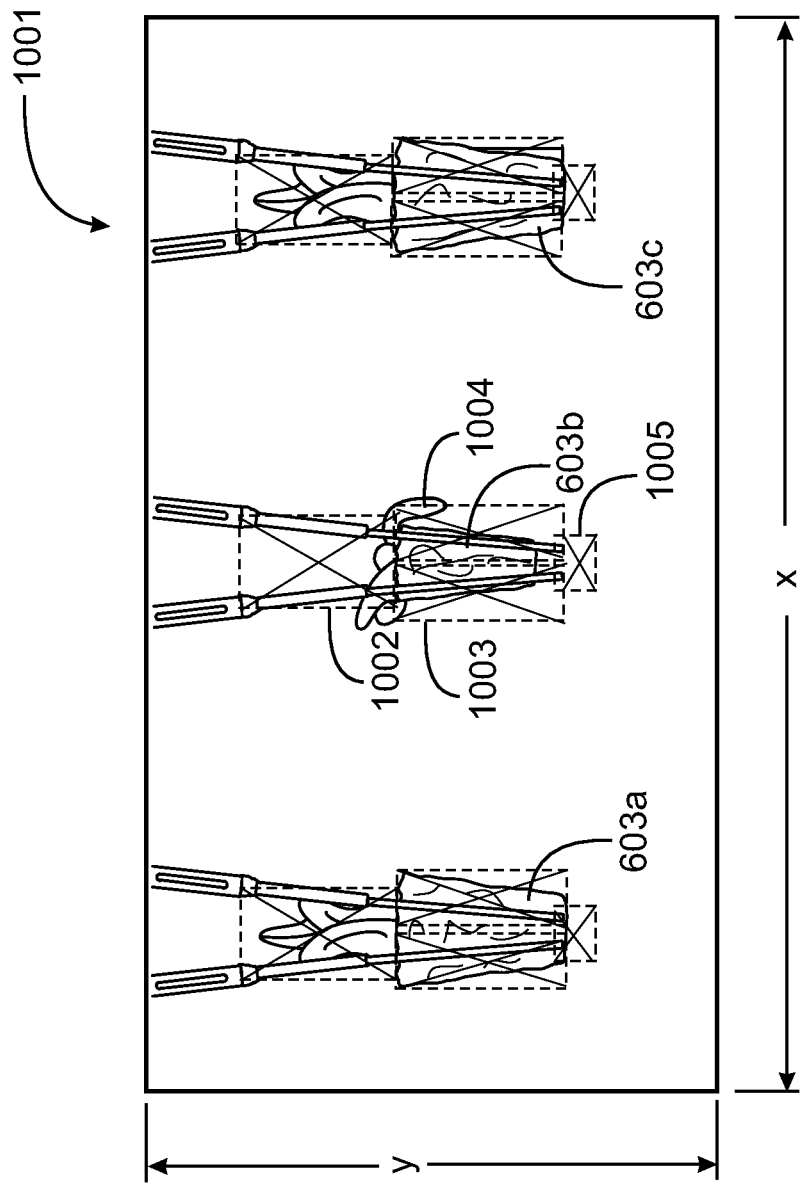
FIG. 10 is a screen shot of an image seen by an imaging device in an embodiment of the invention.

FIG. 10 is an image recorded by imaging device 109 in an embodiment of the invention. As each set of three seedlings is brought from the tray to a vertical position in front of imaging device 109, the imaging device records the image of the three seedlings 603*a*, 603*b* and 603*c* held in the picking mechanisms. In this example the image is a pixelated digital optical image, and is composed of a substantial matrix of pixels, each of which, as is known in the art, have associated pixel values.

In one embodiment the image captured for each set of seedlings is a grayscale image, for which each pixel has one value between one and 255 that represents brightness. Typically, zero is black and 255 is white, with numbers between representing shades of gray.

In FIG. 10 specific regions of the pixelated image are considered to determine the status of a seedling to be viable for planting. For example, in FIG. 10 four specific regions 1002, 1003, 1004 and 1005 are represented. Region 1002 encompasses the area that an image of the foliage of the seedling will largely occupy. Regions 1003 and 1004 are where the opposite sides of the root ball will appear. Region 1005 is for the lower part of the root ball.

The regions in FIG. 10 have element numbers for the image of the center seedling of the three in the overall image. The same analytical regions are shown however for the seedlings to the left and right, but not with the element numbers. Consider first center seedling 603B. SW102 considers pixel values in region 1002 to determine a state of the foliage of the seedling. One step in this process may be simply averaging the values of all of the pixels in region 1002. If there is adequate foliage, the average pixel value will be relatively low, toward black, because much of the region will be occupied by low value pixels, representing matter in the image. In one embodiment the average pixel value may be changed to a number between 1 and 10, a higher number representing a less than optimal foliage, and a lower number representing a more optimal foliage.

It may be seen that region 1003 may be evaluated in the same manner as for region 1002, for one side of the root ball of the seedling, and region 1004 may be analyzed the same way, representing the other side of the root ball. Finally, image region 1005 is analyzed to determine whether the root ball has sufficient height for the seedling to be viable.

In one embodiment the values between one and ten for the four regions may be weighted, and then used to determine a YES/NO decision for the seedling imaged. Seedling 603*b* will likely be rated as NO, not viable to be planted.

At the same time that the image regions for seedling 603*b* is being analyzed, the regions for seedlings 603*a* and 603*c* are also processed, and a YES/NO for each of these two is recorded as well. The determination for each seedling is passed to PLC 112 while the seedlings are held above either funnels 608*a*, 608*b* and 608*c*, or above funnels 608*d*, 608*e* and 608*f*. In operation, a first set of seedlings is presented above funnels 608*a*, 608*b* and 608*c*, then dropped into the funnels, and in a next cycle the set of seedlings is presented above funnels 608*d*, 608*e* and 608*f*, and then dropped into the funnels. It is important to note that the presentation and the dropping of seedlings is accomplished on a timed basis, is never delayed for the processing of images, which is done much faster than the portion of the cycle devoted to the suspension of the seedlings over the funnels.

As mentioned above, seedlings are dropped three at a time into either three side-by-side funnels 608*a*, 608*b* and 608*c*, or into side-by-side funnels 608*d*, 608*e* and 608*f*. The presentation above one row of funnels and then the other row, is alternated regularly, without exception, and the seedlings are dropped into the funnels whether or not the seedlings are deemed fit to plant. Seedlings deemed unfit to plant are not removed from the process.

It was mentioned above that seedlings dropped into one or another of the funnels drop to a clamshell gate whose purpose it is to provide seedlings one at a time to a final lower gate that places seedlings in the furrow that is provided by plow implement 120 as the sled is pulled through a field.

Figure 11B:
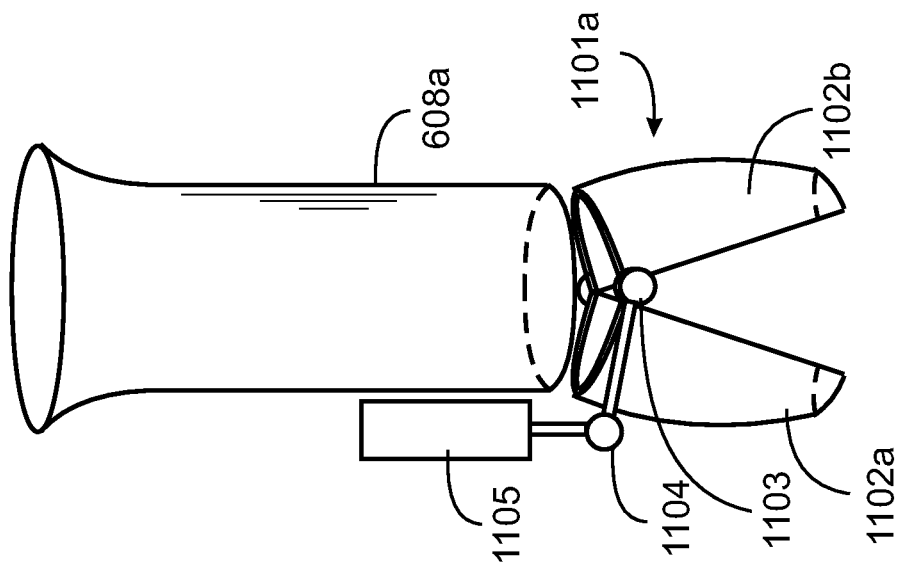
FIG. 11B is an elevation view of the gate of FIG. 11A open.
Figure 11A:
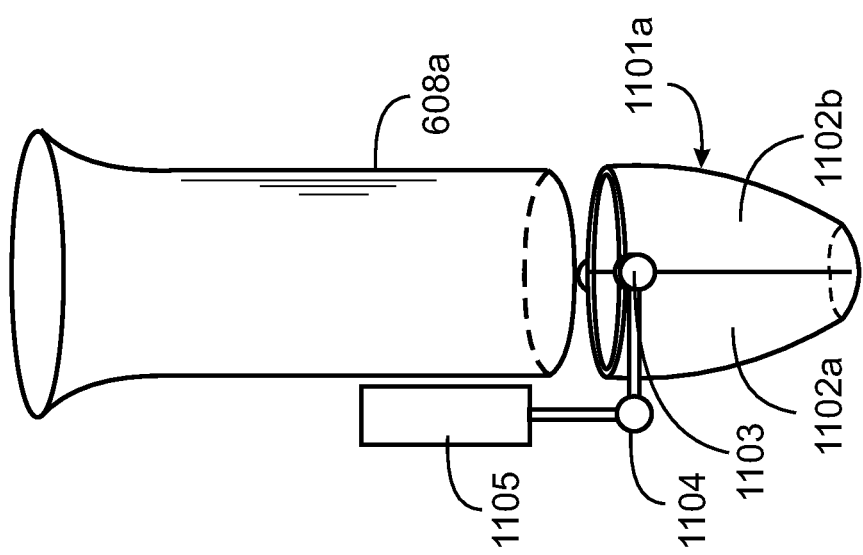
FIG. 11A is an elevation view of a single clamshell gate in an embodiment of the invention.

FIG. 11A is an elevation view of a single clamshell gate 1101*a* closed in an embodiment of the invention, as may be implemented below one of the funnels 608*a*. A seedling dropped by a picking mechanism into funnel 608*a* will fall into clamshell gate 1101*a* and will rest there until the gate is opened. Clamshell gate 1101*a* is split into two portions 1102*a* and 1102*b*, which are hinged at a point 1103, and manipulated by a linkage 104 driven by a pneumatic cylinder 1105. FIG. 11B illustrates cylinder 1105 retracted, opening gate 1101*a*, which will allow a seedling in the gate to drop out of the gate.

Figure 12:
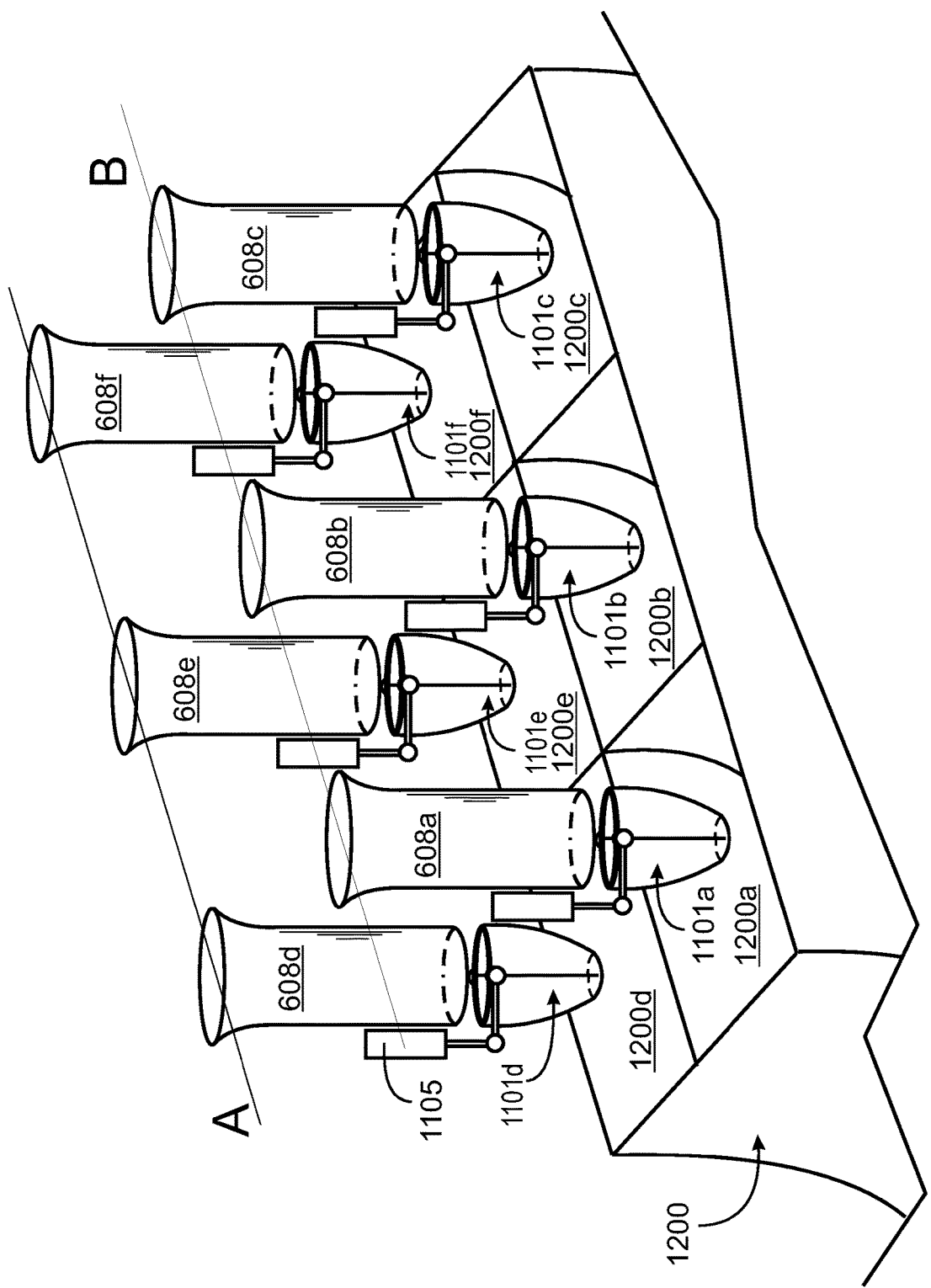
FIG. 12 is a perspective view of six clamshell gates associated with six funnels in an embodiment of the invention.

FIG. 12 is a perspective view of six clamshell gates 1101*a* through 1101*f* associated with six funnels 608*a* through 608*f* in an embodiment of the invention. Three funnels and gates are illustrated along a first line A, and the other three along a second line B. This positioning and spacing is the same as referred to above with reference to FIGS. 6 and 7. The funnels are shown spaced apart somewhat more than in the actual implementation to avoid confusion in the drawing but serve the purpose of description of functions of the apparatus.

In operation the three side-by-side picking mechanisms 400 bring three seedlings from a tray, and suspend them over funnels 608A, 608*b* and 608*c*. The seedlings are then dropped into the funnels. While the seedlings are suspended over the funnels the imaging device and the software determine if each seedling is viable to be planted. This happens rapidly, within the time in the cycle that the picking apparatus operates from one state to another. The determination of viable or not for each seedling is transmitted to the PLC and associated with the clamshell gate into which each seedling is dropped.

After dropping three seedlings into funnels 608a, 608b and 608c, which fall into clamshell gates 1101a, 1101b and 1101c, the picking mechanisms return to the tray, pick three more seedlings, and suspend them over funnels 608d, 608e and 608f. The process repeats as for the last three seedlings, and three seedlings are dropped into funnels 608d, 608e and 608f, falling into clamshell gates 1101d, 1101e and 1101f.

A sheet metal channel array 1200 is positioned directly below the clamshell gates, and has entrance openings 1200a, 1200b, 1200c, 1200d, 1200e and 1200f, one entrance opening for each clamshell gate. The six separate channels in channel array 1200 converge to a single destination, which is a final gate for planting, as is described in enabling detail below.

In operation, clamshell gates 1100x not only release seedlings to a final planting gate in order but serve as a collective reservoir of seedlings such that there will always be a seedling to plant for each potential position in a row. In this example, clamshell gates 1100x are opened in order, a through f, except for an exception due to the imaging apparatus and software determining that a seedling is not viable to plant. If all seedlings are viable, the gates open in order, supplying one seedling to the final gate. If a seedling in a clamshell gate, for example, gate 1101b, that gate will be skipped in the opening order, so gate 1101a will open providing a viable seedling, then gate 1101c will open next. The order will proceed, and new seedlings will be dropped into the funnels and gates by the picking mechanisms.

The probability is very high that, in a next cycle after a gate is skipped, having a not viable seedling, a viable seedling will be dropped into the gate holding the not-viable seedling, so in this next cycle the hold on that gate is erased, and the gate will operate in its order, and two seedlings will be dropped together to the final planting gate, one being the not-so-healthy seedling that caused the skipped gate operation, and the new, viable seedling. The two will be planted together in a single final gate action. This is a very important feature of the invention, assuring that every potential position in a furrow receives a seedling that has been determined to be viable for planting.

There may be, in a very few instances, situations where two seedlings determined not viable to plant may be dropped into a same clamshell gate, and that gate will be skipped twice. The result is not detrimental, as three seedlings, two not viable and one viable, will be planted in one spot. The viable seedling will dominate at that spot.

Figure 13:
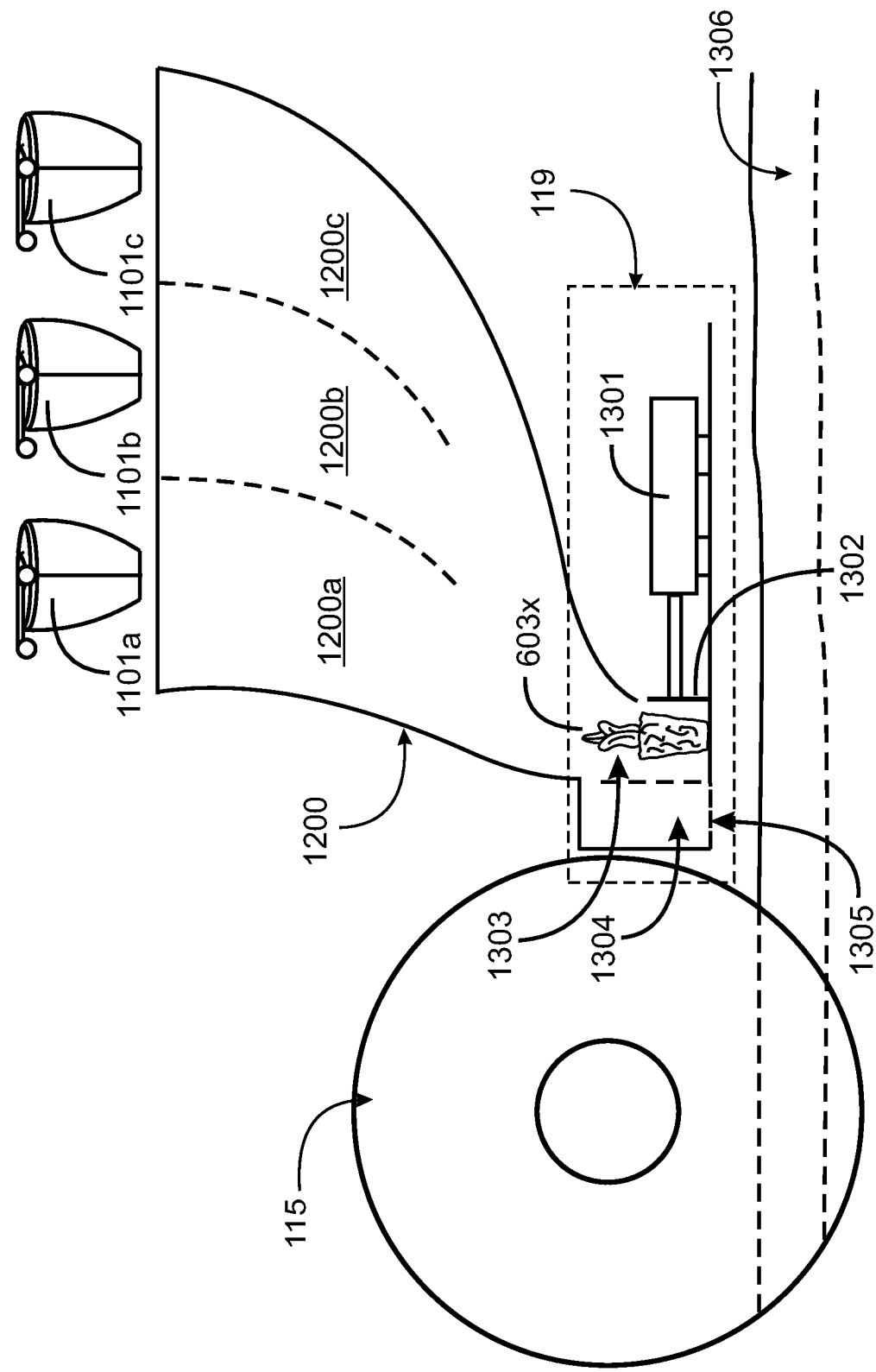
FIG. 13 is an elevation view of a pneumatically operated final positioning gate in an embodiment of the invention.

FIG. 13 is an elevation view of a pneumatically operated final positioning gate 119 in an embodiment of the invention, in relationship to other parts of the transplanting machine. Three of the six clamshell gates 1101a, 1101b and 1101c are shown above openings of channel array 1200, which has internal channels 1200a, 1200b and 1200c arranged such that a seedling dropped into any opening of the channel array will be guided to a single position 1303 in final positioning gate 119. Three other channels behind the three shown, are not seen as they are behind the channels shown. All six channels, however, all lead a seedling to position 1303.

A pneumatic cylinder 1301 in final gate 119 operates to push a seedling, such as seedling 603x, from position 1303 to position 1304, which has an open bottom 1305, so the seedling will fall into furrow 1306, which is formed by plow implement 120 (not shown in FIG. 13). Cylinder 1301 is activated by PLC 112. Timing for activation of cylinder 1301 is determined by a preplanned spacing for seedlings in a row and set or sensed translation speed of the transplant machine pulled on sled runners through a field. Operations that provide seedlings to the final gate are orchestrated to ensure that a viable seedling is always at the final gate to be planted. In some cases, the viable seedling will be accompanied by a seedling deemed not viable to plant, and both are plated together.

In the descriptions above the imaging device is described as a digital device providing pixelated images, and in one embodiment the images are grayscale images having a single pixel value for each pixel, that value representing brightness in the image. In some embodiments the imaging device may produce color images rather than grayscale images, and the evaluation and analysis of portions of images may take into consideration the several pixel values associated with color. In that circumstance, certain colors may be sought, such as green for foliage. In another embodiment the imaging device may be an infra-red camera, and images will indicate temperature of different portions of the seedling being imaged and evaluated. In this circumstance certain prior knowledge may be leveraged in image analysis, such as the fact that a decaying plant, particularly foliage, may be at a higher temperature than living foliage.

The skilled artisan will understand that many of the figures and descriptions above are exemplary, and representative of many mechanisms and apparatus that may be incorporated to accomplish the purposes of the transplanting machine in embodiments of the invention. There are in many cases equivalent mechanisms that may be substituted for those described without departing from the scope of the invention. The invention is limited only by the scope of the claims.

I claim:

1. A transplanting machine comprising:
   a frame capable of being translated through a field;
   at least one plowing implement mounted on the frame, plowing at least one furrow in the field in the direction that the frame is translated;
   for each plowing implement mounted on the frame, a conveyor operable to present seedlings in a tray to picking mechanisms adapted to pick a plurality of seedling simultaneously, and to present the seedlings picked to an imaging device to capture and record a pixelated image of each seedling picked and presented;
   a plurality of mechanical gates arranged to receive the seedlings from the picking mechanisms, each seedling placed into an individual mechanical gate;
   computerized circuitry adapted to analyze portions of the pixelated images of the seedlings, determining suitability of the seedlings to be planted;
   a channel array associated with the plurality of mechanical gates, the channel array having a channel for each mechanical gate, wherein each channel in the channel array leads to a single position at a final planting gate;
   an operating mechanism in the final planting gate adapted to gate each seedling arriving at the single position into the furrow; and
   a closing device adapted to close the furrow as each seedling is placed in the furrow;
   wherein the computerized circuitry determines a Yes/No status for each seedling imaged as suitable to plant; and transmits the status to a controller managing the plurality of mechanical gates, and wherein the controller activates the mechanical gates in a sequential order, feeding a seedling to the single position with each activation, except for a circumstance in which the seedling in the mechanical gate to be activated has been determined to be unsuitable to plant, in which circumstance that mechanical gate is not activated in the sequential order, such that in a subsequent cycle a seedling determined to be suitable to plant will be placed in the mechanical gate along with the seedling determined to be unsuitable to plant, and the two seedlings will be gated to the single position together, and will be planted in the furrow together, ensuring that every potential position for a seedling in the furrow will be planted with a seedling that is determined to be suitable to plant.

2. The transplanting machine of claim 1 comprising two or more plowing implements mounted on the frame providing two or more furrows to be planted with seedlings, wherein the associated elements for each furrow plant a seedling suitable to be planted in each potential position for a seedling in each furrow.

3. The transplanting machine of claim 1 wherein the conveyor for each furrow is an elevator presenting trays of seedlings in individual rows of cavities to a set of two or more side-by-side picking mechanisms.

4. The transplanting machine of claim 3 wherein the picking mechanisms are pneumatically operated with fingers adapted to operate horizontally to pick seedlings from the tray, and wherein the picking mechanisms, retracting from the tray, rotate to present the seedlings in a vertical aspect to the imaging device.

5. The transplanting machine of claim 1 wherein the imaging device is an optical device capturing grayscale images, wherein each pixel has one pixel value representing brightness.

6. The transplanting machine of claim 1 wherein the computerized circuitry divides the pixelated image into a plurality of individual pixel regions for each seedling image, the pixel regions associated with different portions of the seedling, and wherein the individual regions are separately analyzed, assigning a numerical value for each, and the values for the individual regions are used in determining suitability of the seedling to plant.

7. The transplanting machine of claim 1 wherein the imaging device is an optical device capturing color images, wherein each pixel has a plurality of pixel values representing color values, and wherein different colors are preferentially evaluated by the computerized circuitry in determining suitability of seedlings to plant.

8. The transplanting machine of claim 1 wherein the imaging device is an infra-red camera, and images are analyzed for temperature of different regions, and compared to expected temperature values in determining suitability of seedlings to plant.

9. The transplanting machine of claim 1 comprising two plowing implements plowing two furrows, three picking mechanisms operating side-by-side, picking three seedlings at a time from the tray, and six mechanical gates accepting individual seedlings for providing to the single position at the final planting gate.

10. The transplanting machine of claim 1 comprising four plowing implements plowing two furrows, three picking mechanisms operating side-by-side, picking three seedlings at a time from the tray, and six mechanical gates accepting individual seedlings for providing to the single position at the final planting gate.

11. A transplanting method, comprising:
translating a frame through a field;
plowing at least one furrow in the field in the direction that the frame is translated by at least one plowing implement mounted on the frame;
presenting seedlings in a tray on a conveyor to picking mechanisms adapted to pick a plurality of seedling simultaneously from the tray, and presenting the seedlings picked to an imaging device capturing and recording a pixelated image of each seedling picked and presented;
placing each seedling in a mechanical gate of a plurality of mechanical gates arranged to receive the seedlings from the picking mechanisms;
analyzing portions of the pixelated images of the seedlings by computerized circuitry, determining suitability of the seedlings to be planted;
placing the seedlings in individual channels of a channel array from the mechanical gates, guiding each seedling to the final planting gate adapted to gate each seedling arriving at the single position into the furrow;
closing the furrow for each seedling placed in the furrow by closing device; and
determining a Yes/No status for each seedling imaged as suitable to plant;
transmitting the status as suitable to plant for each seedling to a controller managing the mechanical gates;
activating the mechanical gates in a sequential order, feeding a seedling to the single position with each activation, except for a circumstance in which the seedling in the mechanical gate to be activated has been determined to be unsuitable to plant, in which circumstance that mechanical gate is not activated in the sequential order, such that in a subsequent cycle a seedling determined to be suitable to plant is placed in the mechanical gate along with the seedling determined to be unsuitable to plant, and the two seedlings are gated to the single position together, and planted in the furrow together, ensuring that every potential position for a seedling in the furrow is be planted with a seedling that is determined to be suitable to plant.

12. The transplanting method of claim 11 comprising plowing two or more furrows by two or more plowing implements mounted on the frame.

13. The transplanting method of claim 11 comprising presenting trays of seedlings by an elevator in individual rows of cavities to a set of two or more side-by-side picking mechanisms.

14. The transplanting method of claim 13 comprising operating the picking mechanisms horizontally with mechanical fingers of the picking mechanisms pneumatically activated to pick seedlings from the tray, and retracting seedlings from the try and rotating to vertical aspect to present the seedlings to the imaging device.

15. The transplanting method of claim 11 capturing grayscale images with an optical device, wherein each pixel has one pixel value representing brightness.

16. The transplanting method of claim 11 comprising dividing the pixelated images by the computerized circuitry into a plurality of individual pixel regions for each seedling image, the pixel regions associated with different portions of the seedling, and separately analyzing the individual regions, assigning a numerical value for each, and using the values for the individual regions in determining suitability of the seedling to plant.

17. The transplanting method of claim 11 comprising capturing color images, wherein each pixel has a plurality of pixel values representing color values, and wherein different colors are preferentially evaluated by the computerized circuitry in determining suitability of seedlings to plant.

18. The transplanting method of claim 11 comprising capturing images with an infra-red camera, analyzing the images for temperature of different regions, and comparing to expected temperature values in determining suitability of seedlings to plant.

19. The transplanting method of claim 11 comprising plowing two furrows using three picking mechanisms operating side-by-side for each furrow, picking three seedlings at a time from the trays, and operating six mechanical gates accepting individual seedlings for providing to the single position at the final planting gate.

20. The transplanting method of claim 11 comprising plowing four furrows, using three picking mechanisms operating side-by-side for each furrow, picking three seedlings at a time from the trays, and operating six mechanical gates for each furrow accepting individual seedlings for providing to the single position at the final planting gate.

* * * * *